United States Patent [19]

Okubo

[11] 4,224,540

[45] Sep. 23, 1980

[54] DISPLACEMENT CURRENT SENSOR

[76] Inventor: Shigeo Okubo, 5412 N. Nevada, Colorado Springs, Colo. 80907

[21] Appl. No.: 932,582

[22] Filed: Aug. 10, 1978

[51] Int. Cl.$^2$ .......................... G01B 7/00; G11C 13/02
[52] U.S. Cl. ..................................................... 307/400
[58] Field of Search ........................................ 307/400

[56] References Cited

U.S. PATENT DOCUMENTS

| 2,581,063 | 1/1952 | Alexander | 307/400 |
| 3,890,511 | 6/1975 | Haugsjaa et al. | 307/400 |
| 3,942,029 | 3/1976 | Kawakami et al. | 307/400 |

OTHER PUBLICATIONS

Journal of Applied Physics-vol. 43, No. 2, Feb. 1972, pp. 408-411.

Primary Examiner—James W. Moffitt
Attorney, Agent, or Firm—Townsend & Townsend

[57] ABSTRACT

A displacement current sensor for generating electrical signals representative of relative motion between a conductor and an electric field source.

The sensor includes means for generating an electric field and electrically conductive means positioned for interaction with the electric field, the field generating means and the electrically conductive means being relatively movable so that variations in the field encountered by the electrically conductive means induces a displacement current, as opposed to a conduction current, in the electrically conductive means.

The field generating means preferably is fabricated from an electret formed in any one of a wide variety of geometrical shapes, such as planar, cylindrical or special geometrical configurations; the electrically conductive means may comprise one or more plates, wires, rods, or other special shapes.

21 Claims, 10 Drawing Figures $A$ = AREA OF PLATE 11

$\phi_E = AE$ $E = \dfrac{V}{d}$ $\epsilon_0 \phi_E = \epsilon_0 AE = q$ $i_d = \epsilon_0 \dfrac{d\phi_E}{dt}$

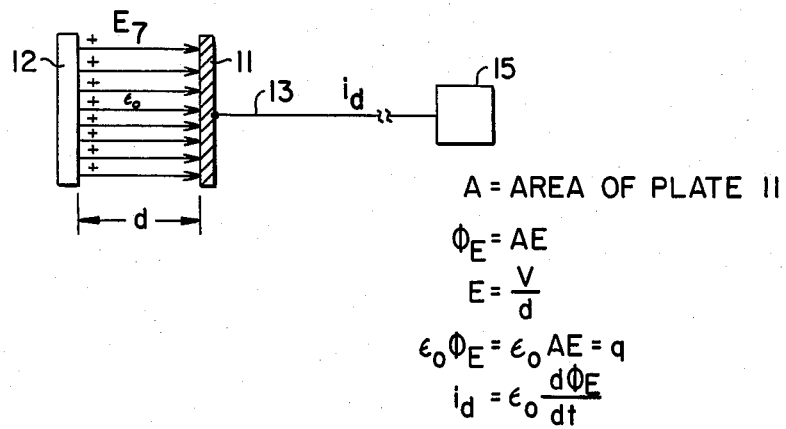
FIG._1.
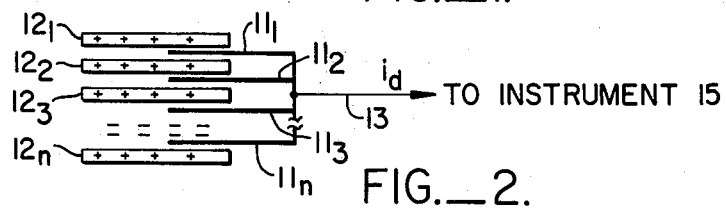
FIG._2.
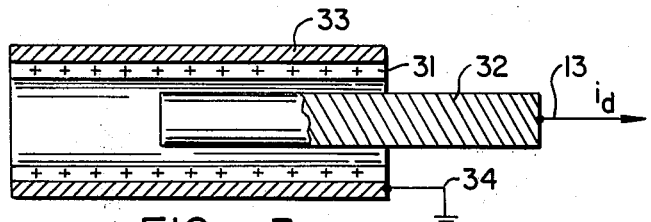
FIG._3.
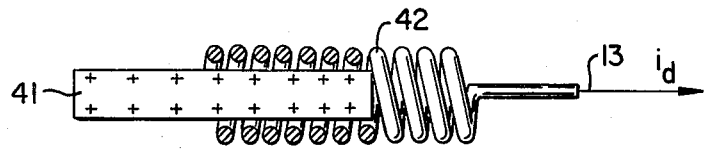
FIG._4.
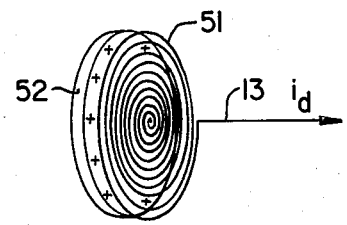
FIG._5.

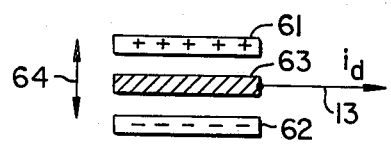
FIG.—6.
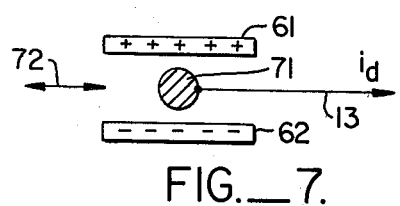
FIG.—7.
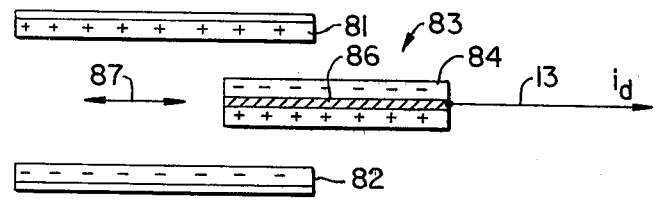
FIG.—8.
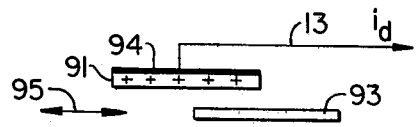
FIG.—9.
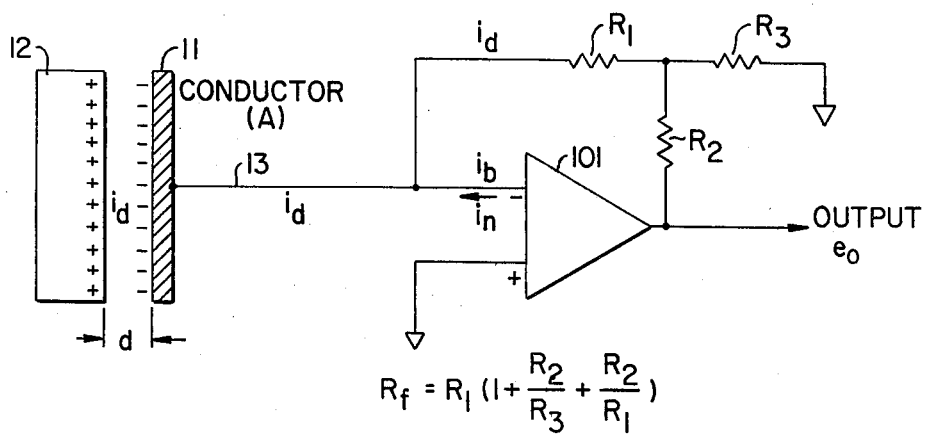
$$R_f = R_1 \left(1 + \frac{R_2}{R_3} + \frac{R_2}{R_1}\right)$$
$$e_o = -i_d R_f + I_b R_f + I_n R_f + V_{os} \frac{(R_2 + R_3)}{R_3} + E_n \frac{(R_2 + R_3)}{R_3}$$
FIG.—10.

DISPLACEMENT CURRENT SENSOR

BACKGROUND OF THE INVENTION

This invention relates to sensors of the type used to generate electrical signals in response to relative motion between two or more sensor elements.

Many types of sensing devices are known which are capable of generating electrical signals in response to the relative motion between two or more sensor elements. Examples of such devices are electromagnetic transducers, in which relative motion between an electrically conductive coil and a magnet produces electrical current signals; electret transducers in which relative motion between an electret member and another member produces an electrical current; piezoelectric transducers, triboelectric transducers and strain gauges. All electromagnetic transducers function in accordance with the principles enunciated by James Clerk Maxwell, usually expressed in the form of the well known Maxwell's Electromagnetic Equation:

$$\phi_c \overline{\beta} \cdot dl = \mu_0 [\epsilon_0 \frac{d\phi_E}{dt} + i]$$

where $\mu_0$ is the permeability of air, $\epsilon_0$ is the permittivity of air, $\phi_E$ is the electric field, $\beta$ is the magnetic field, and l is the length of a closed loop ohmic conductor. The quantity i is the conduction current flowing in the conductor l, while the quantity $[\epsilon_0(d\phi_E/dt)]$ is termed the displacement current. This equation illustrates the interrelationship between a magnetic field and two electrical quantities: viz., the conduction current and the displacement current; and shows that a changing electric field acts as a source for a magnetic field in exactly the same manner as the conduction current which corresponds to charges actually moving along an ohmic conductor. The displacement current has the dimensions of a real current even though actual charges are not transported along an ohmic conductor. Thus, a magnetic field may be established in two ways: Firstly, by a changing electric field (the displacement current term); and secondly, by a conduction current (the conduction current term).

In all known electromagnetic sensors, in which a changing magnetic field is used to generate the electrical current signal, only the conduction current is sensed, since the magnitude of the displacement current is negligible when compared to that of the conduction current. In all other transducers of the class described above, the current produced by the transducer is also a conduction current.

While transducers which employ the conduction current are generally quite useful, certain limitations inhere in any transducer of this type. Since such transducers require a closed loop ohmic circuit for the conductive current, any varying electromagnetic radiation in the vicinity of the closed loop conductive path (which is usually coupled to amplifying the measuring circuitry) produces spurious conductive current signals which are capable of masking the information conveyed in the conductive current signals generated by the transducer. Accordingly, great care is required to shield the conductive loop portion of such sensors against stray electromagnetic radiation. Such shields introduce complexity to the structure of the transducers themselves and also to the structure of the conductive paths used to couple the transducer to the amplifying and measuring circuitry. In addition, with the exception of the electromagnetic transducer noted above, conductive current sensors require the application of electrical power to the closed loop portion of the circuit in order for the device to be operable. While this requirement poses no constraint in many applications, there are other applications for which this requirement is extremely burdensome. For example, in applications requiring the installation of many sensors in a structure for the purpose of monitoring vibrations of the structure, either individual sources of electrical power must be installed at the site of each sensor or the structure must be wired to provide electrical power from a central source to the individual sensors. In an office high-rise building, for example, in which it is desired to install several sensors on each floor of the building to provide vibration information, this requirement is at best costly and at worst impossible for pre-existing structures. In aircraft sensing applications, this requirement is similarly highly undesirable.

In addition to the above-noted disadvantages, conductive current sensors which employ permanent magnets possess additional disadvantages. For example, the energy required to magnetize a permanent magnet is relatively high when compared to the energy required to polarize an electret substance. Further, in sensor applications requiring geometry which is tailored to the geometry of the structural member whose motion or vibration is to be sensed, it can be quite costly and difficult to provide the necessary geometry for the permanent magnets. In addition, permanent magnets possess aging characteristics which result in a reduction of the magnetic field strength provided by the magnet with time, which requires recalibration of the system composed of the individual sensors at predetermined intervals and eventual replacement of the magnets.

SUMMARY OF THE INVENTION

The invention comprises a displacement current sensor which employs an electrically conductive gaussian surface to detect the time rate of change of the electric field generated by charges, i.e., the displacement current induced in the gaussian surface by a varying electric field, the sensor being immune to electromagnetic radiation and requiring no application of electrical power.

Broadly, the invention comprises a displacement current sensor for generating electrical signals representative of relative motion between a conductor and an electric field source, the sensor including means for generating an electric field and electrically conductive means positioned for interaction with the electric field, the field generating means and the electrically conductive means being relatively movable so that variations in the field encountered by the electrically conductive means induces a displacement current, as opposed to a conduction current, therein. Preferably, the field generating means comprises an electret which may be formed in a wide variety of geometrical shapes, such as planar, cylindrical or special geometrical shapes, while the electrically conductive means may comprise plates, wires, rods, or other special shapes.

In the simplest planar embodiment, the field generating means comprises an electret with a planar shape and the electrically conductive means comprises a conductive plate having a surface generally parallel to the plane of the electret but spaced therefrom. In an alternate embodiment, the electrically conductive means comprises a flat spiral coil generally parallel and spaced from the plane of the electret. In other alternate embodiments, multiple electret plates are spaced in a direction normal to the planar surfaces and a plurality of electrically conductive wires or plates are received within the spaces between adjacent electric plates. In still other alternate embodiments, first and second oppositely polarized planar electret members are mutually spaced in a direction normal to the plane of each member, and an electrically conductive rod, wire or plate is received within the space between the electret members. In still another planar embodiment, first and second oppositely polarized generally planar electret members are mutually spaced in a direction normal to the plane of each member, an electrically non-conductive member fabricated from a dielectric or another electret is received within the space between the first and second electret members, and an electrically conductive means is coupled to one of the first and second electret members on the opposite surface thereof from the space, the electrically conductive means providing a gaussian surface for generating an induced displacement current in response to variations in the electric field between the first and second electret members caused by relative motion between these members and the electrically non-conductive interstitial member.

In the simplest embodiment of the invention employing cylindrical geometry, the field generating means comprises a cylindrical electret member, while the electrically conductive means comprises a conductive rod received within the inner diameter of the electret. Alternatively, the electrically conductive means comprises a coil and the field generating means comprises an electret member in the shape of a rod, the rod being received within the inner diameter of the coil.

Each embodiment may be provided with an electrostatic shield to prevent interaction between the field generated by the field generating means and stray electric fields. In addition, all embodiments may be coupled directly to a suitable measuring instrument, such as an electrometer, or may be coupled to the input of an amplifier, which may be either local to the sensor or remote therefrom, and having a relatively low input impedance and negligible zero drift.

All embodiments of the invention are capable of affording high reliability at extremely low cost and light weight and thus are suitable for a wide variety of applications.

For a fuller understanding of the nature and advantages of the invention, reference should be had to the ensuing detailed description taken in conjunction with the accompanying drawings.

BRIEF DESCRIPTION OF THE DRAWINGS

FIG. 1 is a schematic diagram illustrating a first embodiment of the invention employing planar geometry;

FIG. 2 is a schematic diagram of the invention using multiple plate geometry;

FIG. 3 is a schematic diagram of an alternate embodiment of the invention using cylindrical geometry;

FIG. 4 is an alternate embodiment of the invention also using cylindrical geometry;

FIGS. 5-9 illustrate still other embodiments of the invention; and

FIG. 10 is a circuit schematic of an amplifier circuit for use with the invention.

DESCRIPTION OF THE PREFERRED EMBODIMENTS

All embodiments of the invention function by measuring the Maxwell displacement current generated whenever an electric field changes with time. With reference to FIG. 1, an electrically conductive plate 11 is normally spaced by a distance d from an electric field source 12, which may comprise a charged plate, an electret planar member or other equivalent devices. An ohmic conductor 13 is coupled between the plate 11 and a measuring instrument 15 such as an ammeter, an electrometer or the equivalent. Whenever the separation distance d between plate 11 and field source 12 changes, the magnitude of the electric field encountered by the conductive plate 11 changes which produces a displacement current given by the equation:

$$i_d = \epsilon_0 (d\phi_E/dt)$$

From Gauss' law it is known that:

$$E = (q/\epsilon_0 A)$$

where A is the surface area of plate 12 and q is the charge present on or in field source 12. By differentiating the above expression:

$$\frac{dE}{dt} = \frac{1}{\epsilon_0 A} \frac{dq}{dt} = \frac{1}{\epsilon_0 A} i$$

By combining this expression with the expression for Maxwell's displacement current:

$$i_d = \epsilon_0 \frac{d\phi_E}{dt} = \epsilon_0 \frac{d(EA)}{dt} =$$

$$\epsilon_0 A \frac{dE}{dt} = \epsilon_0 A \cdot \frac{1}{\epsilon_0 A} i \quad i_d = i$$

that is, the total current is simply the displacement current. Since the electrical field in the space between plate 11 and electret member 12 is inversely proportional to the separation distance, variation of this distance d causes the generation of displacement current which can be measured directly by the measuring instrument 15. Alternatively, the displacement current may be generated by varying the magnitude of the area A of plate 11, by changing the strength of the charge q on or in field source 12 or by altering the permittivity $\epsilon_0$ of the region between plate 11 and source 12 by inserting a dielectric substance having a different permittivity than air. As an example of the magnitude of displacement current which can be generated, for a circular plate 11 and a circular electret member 12 each having a diameter of 10 centimeters and a changing electric field of $10^{12}$ volts per meter-second, the displacement current is 0.070 amp, which is a very detectable magnitude.

The magnitude of the displacement current may be increased by using the arrangement of FIG. 2 in which a plurality of conductive plates 11 are received within the spaces between adjacent ones of a plurality of field generating plates 12, the conductive plates 11 being coupled in parallel to lead 13 and thus to the measuring instrument 15. Alternatively, lead 13 may be coupled to the input of the amplifier shown in FIG. 10, described below.

It should be noted that the geometry of the plate 11 and the electric field generating element 12 may assume any suitable configuration, such as circular, rectangular, square or special configurations required in any given application of the sensor. While in the FIG. 1 embodiment the displacement current may be generated by varying either the separation distance d or by translating plate 11 or field generating element 12 in the vertical plane as illustrated in order to vary the effective area of the plate 11, in the FIG. 2 embodiment motion is restricted to horizontal movement as depicted.

FIG. 3 illustrates a cylindrical embodiment of the invention in which the field generating element comprises a cylindrical electret member 31 and the conductive member comprises a conductive rod 32 having an outer diameter which is less than the inner diameter of the electret member 31. In this embodiment, an electrostatic shield 33 fabricated from a suitable material such as aluminum foil is placed about the electret member 31 and coupled to a reference potential 34, such as ground, in order to shield the sensor from the effects of stray electrostatic fields. It should be noted that a major advantage of sensors fabricated in accordance with the invention is the fact that such sensors are completely immune to electromagnetic radiation, since the electrically conductive member 11, 32 is connected in an open loop configuration.

FIG. 4 illustrates an alternate cylindrical embodiment of the invention in which the electret comprises a solid cylindrical rod 41 and the electrically conductive member comprises a coil 42 having an inner diameter greater than the outer diameter of the rod 41.

In both the FIG. 3 and FIG. 4 embodiments, relative axial motion, or torsional motion, of either of the elements results in the generation of the displacement current.

FIG. 5 illustrates an alternate planar embodiment of the invention in which the electrically conductive member comprises a flat spiral coil 51. In this embodiment, the displacement current may be generated either by motion in a plane parallel to the coil 51 or field generating plate 52 or by motion perpendicular to such planes.

FIG. 6 illustrates an alternate embodiment of the invention in which the electric field generating means comprises a pair of spaced plates 61, 62 bearing charges of opposite polarity, and in which the electrically conductive member comprises an interstitial plate 63 arranged for movement in the direction of the vertically depicted arrow 64.

FIG. 7 shows a variation of the FIG. 6 arrangement in which the electrically conductive member comprises a wire or rod 71 arranged for motion in the direction of the horizontally depicted arrow 72.

FIG. 8 shows an alternate embodiment of the invention employing planar geometry in which oppositely charged field generating plates 81, 82 coact with a member generally designated by reference numeral 83 and comprising a sandwich fabricated from oppositely polarized dielectric layers 84, 85 and intermediate electrically conductive plate 86.

FIG. 9 illustrates an alternate embodiment of the invention in which a spaced pair of oppositely polarized electret plates 91, 92 coact with a translatable electrically non-conductive interstitial plate fabricated from a dielectric material or an electret. The electrically conductive member in this embodiment comprises a conductive layer 94 adhered to the surface of electret member 91 on the opposite surface from that defining the gap.

While the field generating elements 12, 31, 41, 52, 61, 62, 81, 82, 91, and 92 may comprise any one of a number of elements capable of establishing the electrostatic field required, such as charge bearing conductive plates, these elements are preferably fabricated from any one of a number of suitable electret substances which are permanently polarized. Examples of such electrets may be taken from the class of polymer electrets, which are polymers consisting of microcrystals embedded in an amorphous matrix and whose composition varies from a few percent up to 90%. Examples of such polymer electrets are acrylics, ethylcellulose, polystyrene, vinyl polymers, polyurethane, and materials sold under the trademark "MYLAR" or "TEFLON". Fabrication of electrets is a well known process which generally proceeds by heating the electret material to a temperature just below the melting point in the presence of an electric field, and subsequently permitting the electret to cool, also in the presence of the field.

So called monocharge electrets are highly suitable for use in fabricating sensors according to the invention. These electrets are thin film electrets having a single charge, either positive or negative. Electrets of this type fabricated from TEFLON have a thickness in the range from 12 to 25 microns and have been charged to a charge density in the range from about 10 to about 20 nanocoulombs per square meter. Such electrets are capable of providing a vibrational frequency response of extremely broad bandwidth in the range from about $10^{-3}$ to about $2 \times 10^8$ Hz. Further, such electrets have a longer charge lifetime due to the absence of recombination losses and the possibility of a larger gap separation with comparable electric flux than other types of electrets.

As noted above, in some applications of the invention it may be desired to amplify the displacement current signals produced by sensors fabricated according to the invention. FIG. 10 is a schematic of an amplifier circuit which is suitable for such use. As shown in this figure, an operational amplifier 101, preferably a Burr-Brown type Model 3430 amplifier, has a first input which is coupled via input conductor 13 to electrically conductive plate 11 and a second input which is coupled to reference potential, such as ground. Amplifier 101 is configured by means of resistances R1, R3 and R4 as a current feedback current-to-voltage transformation mode amplifier, and is capable of measuring extremely small currents on the order of 1 picoampere ($10^{-12}$ amp). For the Burr-Brown type of amplifier noted above, the operational characteristics are as follows:

| | |
|---|---|
| Open loop gain (A) | 100 db |
| Input bias current ($I_b$) | $10 \times 10^{-15}$ amp |
| Input current noise ($I_n$) | $1 \times 10^{-15}$ amp |
| Input offset voltage ($V_{os}$) | $30 \times 10^{-6}$ volt/°C. |
| Input noise voltage ($E_n$) | $10 \times 10^{-6}$ volt/°C. |
| High input resistance | $1 \times 10^{14}$ ohms |

For a feedback resistance of $10^{12}$ ohms, a displacement current of 1 picoamp will produce a signal of 1 volt at the output of the circuit. With a resolution of 1 millivolt, an input current resolution of $10^{-15}$ amp is possible. Preferably, the value of (R2+R3/R3) should be less than 100 in order to restrict noise error voltages. The dependence of zero drift on the ratio of $R_f$ to the equivalent internal impedance of the sensor leads to the limitation on the value of $R_f$ to a value no larger than the source impedance. However, since the sensor source impedance is that of an open loop circuit, very large values of $R_f$ can be used without incurring drift problems. The advantage of employing a relatively high open loop gain comprises the corresponding reduction of the equivalent operational amplifier input impedance by a factor of $(1/A)$. This relatively low impedance employed in low current measurements assures measurement accuracies and reduces insulation requirements for the components. The input capacitance is also reduced by a factor of $(1/A)$, so that the measurement rise time is no longer a function of the input RC time constant and becomes a function of $R_f \times C_f$ where $C_f$ is the shunt capacity of $R_f$. Thus, the displacement current, although very small in magnitude, may be readily converted to usable voltages with the circuit of FIG. 10. In addition, the amplifier circuitry can be located either at the sensor or at a remote site, because of the principle of the continuity of current, i.e., the value of the displacement current is the same at each point in the circuit.

Sensors fabricated according to the invention are ideally suited for a wide variety of applications, due to their low cost, light weight, noise immunity, simplicity of construction, and adaptability to different geometrical configurations. Such sensors, for example, may be used to measure linear or torsional displacements of structural members, such as support beams in buildings, aircraft struts; to measure ultrasonic vibrations in liquids and solids; in crystalography to measure stress, strain, crystal growth and cleavage; in the field of bionics to measure changing electric fields from living organs, such as the human central nervous system or human brain; in atmospheric physics to measure atmospheric currents; in acoustic holography to measure signal transmission modes in dielectrics and conductors; and in other applications which will occur to those skilled in the art.

When fabricated using electret materials, the sensors are also energy efficient in that the energy required to establish a uniform electric field required to polarize the electret is substantially less than the energy required to set up a comparable uniform magnetic field required to orient a permanent magnet.

While the above provides a full and complete disclosure of the invention, various modifications, alternate constructions and equivalents may be employed without departing from the true spirit and scope of the invention. Therefore, the above description and illustrations should not be construed as limiting the scope of the invention, which is defined by the appended claims.

What is claimed is:

1. A displacement current sensor for generating electrical signals representative of relative motion between a conductor and an electric field, said sensor comprising:
    means for generating an electric field;
    electrically conductive means positioned for interaction with said electric field, said field generating means and said electrically conductive means being relatively arranged in such a manner that variations in the field encountered by said electrically conductive means induce a displacement current in said electrically conductive means; and
    single electrically conductive output terminal means coupled to said electrically conductive means for manifesting said displacement current.

2. The combination of claim 1 further including an electric shield means for preventing interaction between said electric field and stray electric fields.

3. The combination of claim 1 further including amplifier means having an input coupled to said electrically conductive means for amplifying said displacement current.

4. The combination of claim 1 wherein said field generating means comprises an electret.

5. The combination of claim 4 wherein said electret has a planar shape and said electrically conductive means comprises a wire.

6. The combination of claim 5 wherein said wire is formed as a flat spiral coil generally parallel to the plane of said electret.

7. The combination of claim 4 wherein said electret has a planar shape and said electrically conductive means comprises a conductive plate having a surface generally parallel to the plane of said electret.

8. The combination of claim 4 wherein said electret has a cylindrical shape and said electrically conductive means comprises a conductive rod received within the inner diameter of said electret in non-contacting relationship.

9. The combination of claim 8 wherein said electret is surrounded by an electrically conductive shield.

10. The combination of claim 4 wherein said electrically conductive means comprises a coil and said electret has the shape of a rod, said rod being received within the inner diameter of said coil in non-contacting relationship.

11. The combination of claim 1 wherein said field generating means comprises a plurality of generally planar electret members mutually spaced in a direction normal to the plane of each member, and wherein said electrically conductive means comprises a plurality of electrically conductive members each received with a different space between adjacent electret members, said electrically conductive members being arranged in non-contacting relationship with said electret members.

12. The combination of claim 11 wherein said electrically conductive members are wires.

13. The combination of claim 11 wherein said electrically conductive members are plates.

14. The combination of claim 1 wherein said field generating means comprises a first pair of oppositely polarized generally planar electret members mutually spaced in a direction normal to the plane of each member, and wherein said electrically conductive means comprises an electrically conductive member received within the space between said electret members in non-contacting relation therewith.

15. The combination of claim 14 wherein said electrically conductive member is a wire.

16. The combination of claim 14 wherein said electrically conductive member is a plate.

17. The combination of claim 14 further including a second pair of oppositely polarized generally planar electret members coupled to said electrically conductive member, the polarity of each of said second pair of oppositely polarized electret members being opposite to the polarity of the facing one of said first pair of oppositely polarized electret members.

18. A displacement current sensor for generating electrical signals representative of relative motion between a conductor and an electric field, said sensor comprising:

first and second oppositely polarized generally planar electret members mutually spaced in a direction normal to the plane of each member;

an electrically non-conductive member received within the space between said first and second electret members and arranged for relative motion therewith in noncontacting relationship;

electrically conductive means coupled to one of said first and second electret members on the opposite surface thereof from said space and providing a gaussian surface for generating an induced displacement current in response to variations in the electric field between said first and second electret members; and single electrically conductive output terminal means coupled to said electrically conductive means for manifesting said displacement current.

19. The combination of claim 18 wherein said electrically non-conductive member comprises a dielectric.

20. The combination of claim 18 wherein said electrically non-conductive member comprises an electret.

21. The combination of claim 18 wherein said electrically conductive means comprises a flat member adhered to said opposite surface.